United States Patent
Brendel et al.

(10) Patent No.: US 11,667,408 B2
(45) Date of Patent: Jun. 6, 2023

(54) METAL ENCAPSULATED CERAMIC TILE THERMAL INSULATION, AND ASSOCIATED SYSTEMS AND METHODS

(71) Applicant: Blue Origin, LLC, Kent, WA (US)

(72) Inventors: John Paul Brendel, Lake Tapps, WA (US); Christopher Patrick Hupf, Maple Valley, WA (US); Adam Keith Norman, Maple Valley, WA (US)

(73) Assignee: Blue Origin, LLC, Kent, WA (US)

( * ) Notice: Subject to any disclaimer, the term of this patent is extended or adjusted under 35 U.S.C. 154(b) by 464 days.

(21) Appl. No.: 16/437,529

(22) Filed: Jun. 11, 2019

(65) Prior Publication Data
US 2020/0002030 A1 Jan. 2, 2020

Related U.S. Application Data
(60) Provisional application No. 62/684,145, filed on Jun. 12, 2018.

(51) Int. Cl.
*B64G 1/58* (2006.01)
*B64G 1/62* (2006.01)
(Continued)

(52) U.S. Cl.
CPC .............. *B64G 1/58* (2013.01); *B64G 1/005* (2013.01); *B64G 1/62* (2013.01); *F16L 59/029* (2013.01)

(58) Field of Classification Search
CPC ............ B64G 1/58; B64G 1/62; F16L 59/029
See application file for complete search history.

(56) References Cited

U.S. PATENT DOCUMENTS 3,318,064 A * 5/1967 Mayfield .................. B64G 1/58
52/794.1
3,612,447 A * 10/1971 Newsom ................... B64C 1/38
244/117 A
(Continued)

FOREIGN PATENT DOCUMENTS

JP 02078762 3/1990
RU 2016348 7/1994
(Continued)

OTHER PUBLICATIONS

International Search Report and Written Opinion for International Patent Application No. PCT/US2019/036511, Applicant: Blue Origin, LLC., dated Sep. 26, 2019, 8 pages.
(Continued)

*Primary Examiner* — Richard Green
*Assistant Examiner* — Madison Elizabeth Dittner
(74) *Attorney, Agent, or Firm* — Perkins Coie LLP (57) ABSTRACT

A metal encapsulated ceramic tile thermal insulation system for rockets and associated methods is disclosed. A representative system includes a launch vehicle having a first end and a second end generally opposite the first end and includes a heat shield positioned at the second end. The heat shield includes a plurality of thermal protection apparatuses, where individual of the thermal protection apparatuses include ceramic tiles encapsulated by inner and outer metal layers, which are positioned on opposing top and bottom surfaces of the ceramic tiles. The plurality of thermal protection apparatuses includes a plurality of pins positioned within corresponding holes drilled through the ceramic tiles and are secured to the metal layers. The outer metal layer can protect the ceramic tile from tool strikes and debris and can also prevent water from reaching and being absorbed by the ceramic tile.

20 Claims, 6 Drawing Sheets

(51) Int. Cl.
    *B64G 1/00*    (2006.01)
    *F16L 59/02*    (2006.01)

(56) References Cited

U.S. PATENT DOCUMENTS

| | | | |
|---|---|---|---|
| 4,456,208 A * | 6/1984 | MacConochie | B64G 1/58 244/159.1 |
| 4,499,134 A | 2/1985 | Whitely et al. | |
| 4,619,553 A | 10/1986 | Fischer | |
| 4,877,689 A | 10/1989 | Onstott | |
| 4,919,366 A | 4/1990 | Cormier | |
| 5,030,518 A | 7/1991 | Keller | |
| 5,038,693 A | 8/1991 | Kourtides | |
| 5,322,725 A | 6/1994 | Ackerman et al. | |
| 5,451,448 A | 9/1995 | Sawko et al. | |
| 5,626,951 A | 5/1997 | Hogenson | |
| 5,740,985 A | 4/1998 | Scott et al. | |
| 5,803,406 A * | 9/1998 | Kolodziej | B64G 1/58 244/131 |
| 5,811,168 A | 9/1998 | Raksy et al. | |
| 6,293,496 B1 * | 9/2001 | Moe | B64G 1/58 244/119 |
| 6,418,973 B1 | 7/2002 | Cox | |
| 6,497,390 B1 | 12/2002 | Fischer et al. | |
| 6,827,312 B2 * | 12/2004 | Riedell | B64G 1/58 244/133 |
| 7,485,354 B2 | 2/2009 | Bohner et al. | |
| 7,510,754 B2 | 3/2009 | DiChaiara et al. | |
| 8,147,943 B1 * | 4/2012 | Byrd | B64G 1/58 428/99 |
| 9,290,865 B2 | 3/2016 | McClain et al. | |
| 2011/0318531 A1 | 12/2011 | Krusch | |
| 2016/0031180 A1 | 2/2016 | Baroux et al. | |
| 2017/0218542 A1 | 8/2017 | Stewart et al. | |
| 2019/0345896 A1 | 11/2019 | Norman | |

FOREIGN PATENT DOCUMENTS

| | | |
|---|---|---|
| RU | 2142596 | 12/1999 |
| RU | 2344972 | 1/2009 |
| RU | 2583532 | 5/2016 |
| RU | 2622181 | 6/2017 |
| RU | 179194 | 5/2018 |

OTHER PUBLICATIONS

ASM Aerospace Specification Metals Inc., Special Metals INCONEL Alloy 718, 2005, 3 pages.

Bergin, Chris, "SLS Program Pressing Forward with Engine Heat Shield Design Change," NASASpaceFlight.com, Sep. 3, 2012, 4 pages.

* cited by examiner

METAL ENCAPSULATED CERAMIC TILE THERMAL INSULATION, AND ASSOCIATED SYSTEMS AND METHODS

CROSS-REFERENCE TO RELATED APPLICATION

This non-provisional patent application claims the benefit of and priority to U.S. Provisional Patent Application No. 62/684,145, titled "METAL ENCAPSULATED CERAMIC TILE THERMAL INSULATION, AND ASSOCIATED SYSTEMS AND METHODS", filed Jun. 12, 2018, which is incorporated herein in its entirety by reference.

TECHNICAL FIELD

The present technology relates to metal encapsulated ceramic tile thermal insulation, and associated systems and methods, for example, thermal protection systems and heat shields for rockets.

BACKGROUND

Rocket manufacturers continually strive to reduce the costs of launching a payload into space. One approach for reducing such costs is to retrieve one or more booster stages used to propel the space launch vehicle. In a particular approach, the booster is launched and landed vertically and refurbished for another launch. One drawback to this approach is that the exterior surfaces of the booster, including the engine nozzles, are subjected to high temperatures, which can result in damage to these surfaces during ascent and/or descent. To overcome this drawback, launch and reentry vehicle manufacturers utilize insulation and cooling systems designed to reduce the amount of heat the engine nozzles and/or other surfaces are exposed to during flight. Conventional types of insulation include ceramic tiles that form a heat shield on the bottom surface of the booster. However, these ceramic tiles are brittle and not very robust, often requiring refurbishment between launches. Further, the ceramic tiles are typically very porous and must be waterproofed before every launch to prevent the tiles from soaking up water, which undesirably increases the weight of the booster. Accordingly, there is a need for improved insulation systems, e.g., for reusable launch vehicles.

DETAILED DESCRIPTION

Several embodiments of the present technology are directed to systems and apparatuses for insulating structures, e.g., rocket structures and components, to reduce the effects of heat. For example, the present technology can include a thermal protection apparatus having a rigid insulation layer positioned between and attached to two metal layers using pins. The thermal protection apparatus can be attached to the rocket components with an adhesive or with fasteners that couple to the pins. This approach can combine the insulating properties of the rigid insulation layer with the strength and durability of the metal to insulate the rocket when the rocket reenters the atmosphere and lands. For example, the rigid insulation can inhibit or prevent heat from penetrating through the thermal protection apparatus to the body of the rocket during reentry, while the metal layers can reduce damage to the rigid insulation from foreign object damage and can help to prevent water from reaching and being absorbed by the insulation. Further, the pins can be placed in holes formed through both the insulation and the metal layers and can be attached to the metal layers in order to secure the metal layers to the insulation. As a result, the thermal protection apparatus can insulate the rocket structures and components using the insulation while the metal layers can protect the insulation from damage.

Specific details of several embodiments of the disclosed technology are described below with reference to particular, representative configurations. The disclosed technology can be practiced in accordance with rockets, heat shields, and/or insulation having other suitable configurations. Specific details describing structures or processes that are well-known and often associated with rockets and insulation, but that can unnecessarily obscure some significant aspects of the presently disclosed technology, are not set forth in the following description for purposes of clarity. Moreover, although the following disclosure sets forth some embodiments of different aspects of the disclosed technology, some embodiments of the technology can have configurations and/or components different than those described in this section. Further, unless otherwise specifically noted, elements depicted in the drawings are not necessarily drawn to scale. As such, the present technology can include some embodiments with additional elements and/or without several of the elements described below with reference to FIGS. 1-8.

Figure 1:
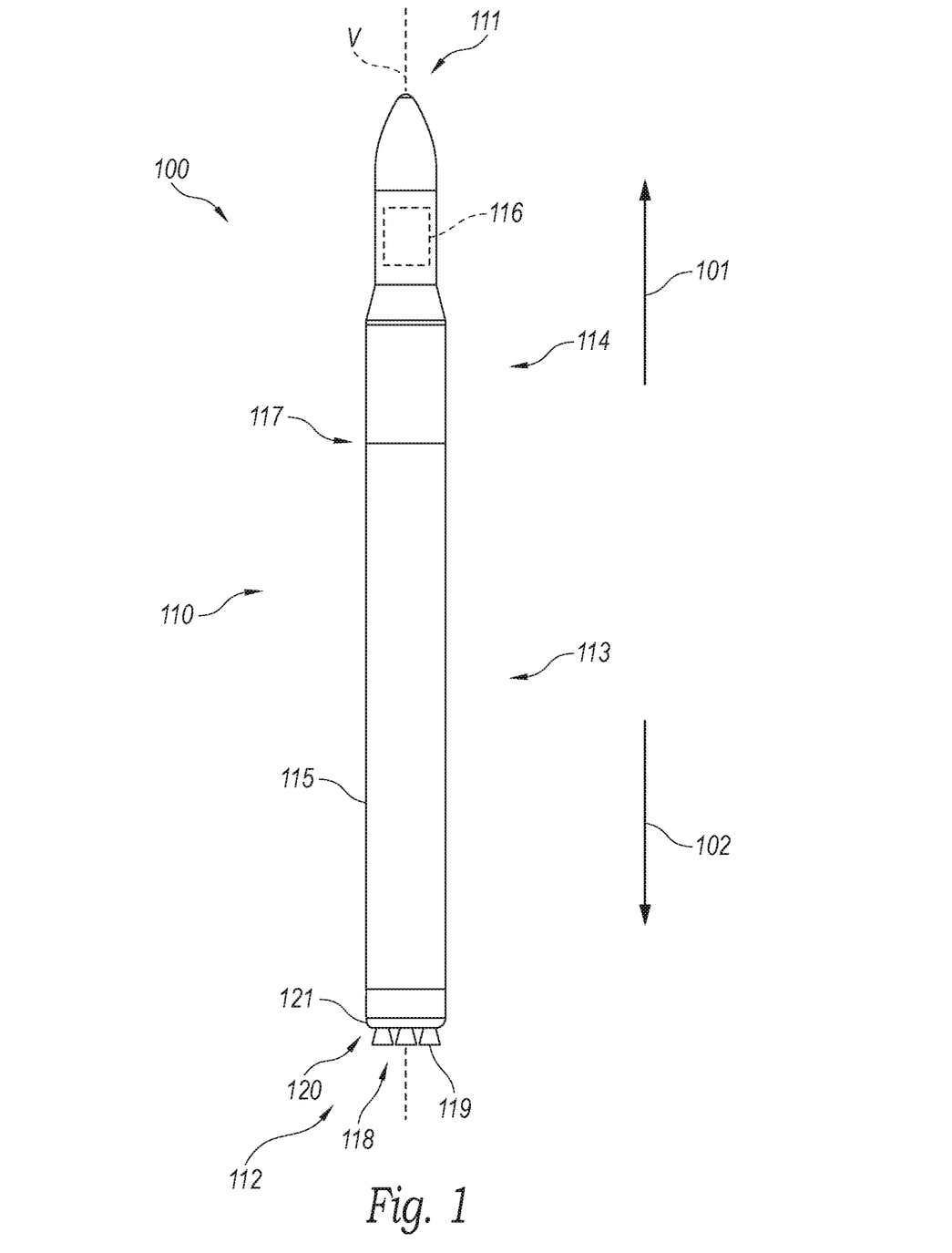
FIG. 1 is a partially schematic, side elevation view of a representative launch vehicle system having insulation systems configured in accordance with embodiments of the present technology.

FIG. 1 is a partially schematic elevation view of a system 100 that includes a launch vehicle 110 having opposing first and second ends 111 and 112 and that is capable of ascending and descending in opposite directions but with generally the same orientation (e.g., a tail-down orientation). Accordingly, the launch vehicle 110 can ascend in a first direction 101 and descend in a second direction 102. The launch vehicle 110 includes a first stage 113 (e.g., a booster) having a body 115, and a second stage 114 that can carry a payload 116 (e.g., one or more humans, supplies, experiments, etc.). In other embodiments, the launch vehicle 110 can include other numbers of stages (e.g., a single stage or more than two stages). The launch vehicle 110 is elongated along a vehicle axis V and the payload 116 can be positioned at the first end 111. The launch vehicle 110 can include a pre-determined separation location 117 at which the first stage 113 separates from the second stage 114, typically during ascent. The launch vehicle 110 can also include landing gear that support the launch vehicle 110 when it is not airborne or spaceborne, and one or more elements (e.g., fins) that provide stability and control for the launch vehicle 110.

The first stage 113 includes a propulsion system 118 positioned at the second end 112 and coupled to the body 115. The propulsion system 118 includes nozzles 119 oriented to direct exhaust products in a generally downward direction (i.e. in the second direction 102). The propulsion system 118 also includes a plurality of combustion chambers located within the body 115 of the launch vehicle 110, with each of the nozzles 119 coupled to a given one of the combustion chambers. Each of the combustion chambers receives fuel from a fuel pump coupled to a fuel tank within the body 115. An igniter ignites the fuel within the combustion chambers, creating high energy exhaust products that are directed through the associated nozzles 119. Each of the nozzles 119 is positioned to direct the exhaust products away from the second end 112 of the launch vehicle 110 (e.g., in the second direction 102), thereby generating thrust that propels the launch vehicle in the first direction 101.

Once the launch vehicle 110 reaches a specific and pre-determined point in the launch process (e.g., a specific altitude or speed, a specific amount of fuel consumed, etc.), the first and second stages 113 and 114 separate from each other at the separation location 117. In some embodiments, the second stage 114 includes a secondary propulsion system used to propel the second stage 114 towards its final destination after the first and second stages 113 and 114 separate, while the first stage 113 returns back to earth. In other embodiments, the second stage 114 does not include a secondary propulsion system and both the first and second stages 113 and 114 return to earth after separation. The first stage 113 can also include lateral thrusters to stabilize and control the first stage 113 as it returns to earth. Further details of the lateral thrusters are included in pending U.S. Published Patent Application No. US 2017/0349301, incorporated herein by reference.

As the first stage 113 descends, the propulsion system 118 and the lateral thrusters work together to control the orientation and speed of the first stage 113 as it returns to earth. In a representative embodiment, the propulsion system 118 and the lateral thrusters control the first stage 113 as it descends such that first stage 113 moves in the second direction 102 and the vehicle axis V is generally parallel to the second direction 102. As it approaches the landing site, the first stage 113 has a generally vertical orientation such that the second direction 102 and the vehicle axis V are both oriented perpendicular to the ground and the one or more nozzles 119 direct the exhaust products downward, causing the first stage 113 to decelerate. Landing gear, which can be stowed during ascent and descent, extend from the body of the first stage 113 and support the weight of the first stage 113 as it lands. Once the first stage 113 lands, the propulsion system 118 shuts down and the first stage 113 is secured to the landing site. In this way, the first stage 113 may be used for subsequent launches and only minor refurbishments and part replacements may be required between subsequent launches of the first stage 113.

Throughout the launching and landing processes, the launch vehicle 110 is subjected to extreme conditions. For example, the second end 112 of the first stage 113 is subjected to high air pressures and temperatures caused by friction between the air and the second end 112. To reduce the effects of the high temperatures, the launch vehicle 110 includes a thermal protection system 120 positioned at or at least toward the second end 112, and that includes shielding, insulation, and/or other cooling systems. For example, to protect the second end 112 of the body 115 from these high temperatures, the thermal protection system 120 also includes a heat shield 121 coupled to the body 115 at the second end 112. The heat shield 121 is positioned against the body 115 and insulates the body 115 from the high temperatures.

Figure 2:
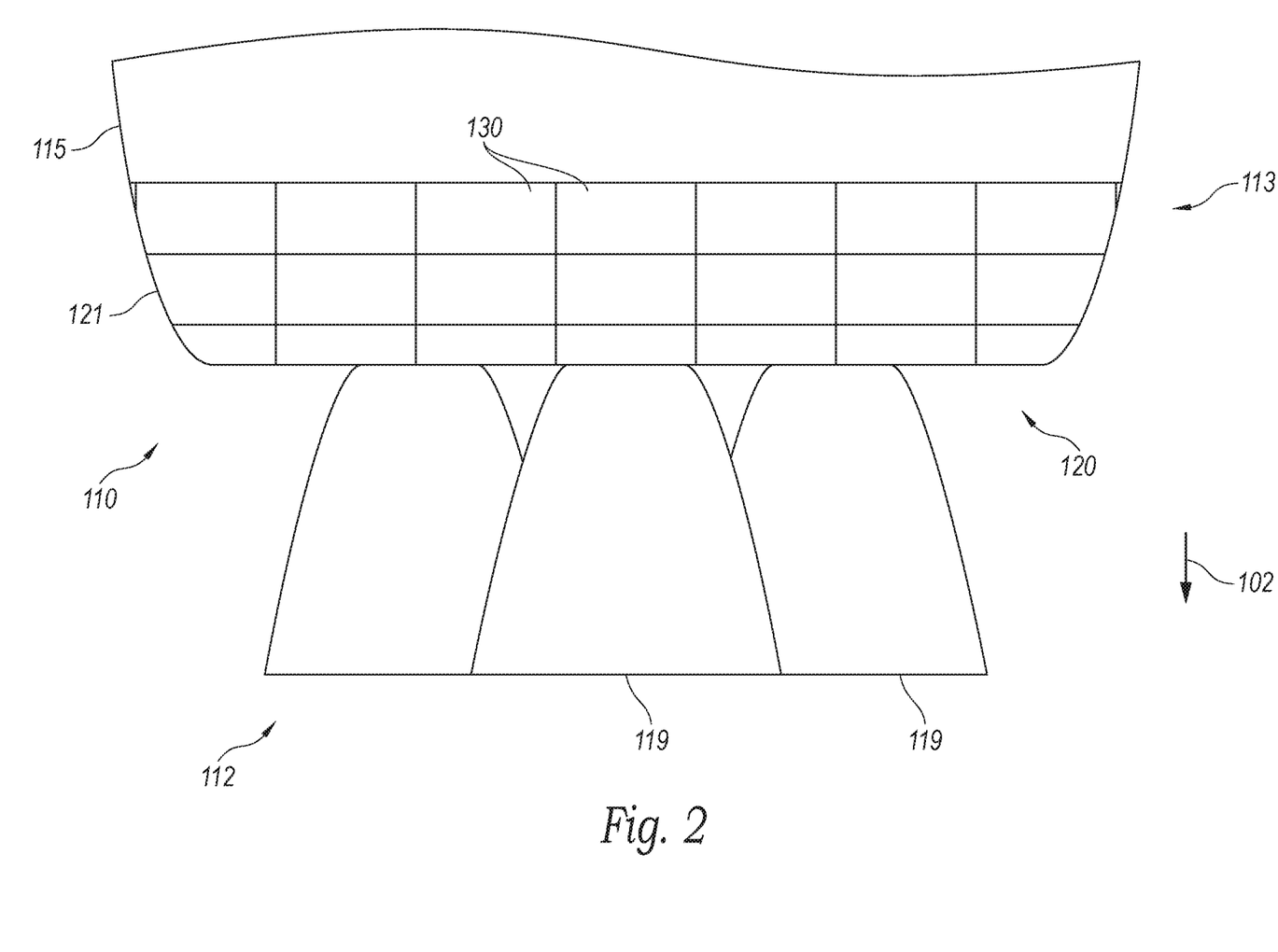
FIG. 2 is an enlarged, partially schematic, elevation view of one end of the launch vehicle of FIG. 1 having a heat shield formed from thermal protection apparatuses, configured in accordance with embodiments of the present technology.

FIG. 2 shows an enlarged view of the second end 112 of the first stage 113 of the launch vehicle 110. The heat shield 121 is coupled to the body 115 of the first stage 113 adjacent to the nozzles 119 and is used to insulate the body 115 from high temperatures as the first stage 113 descends in the second direction 102. The heat shield 121 can be formed from a plurality of thermal protection apparatuses 130 securely coupled to the body 115. The thermal protection apparatuses 130 can be modular, and can be arranged in an array over the second end 112 of the body 115 to fully cover the second end 112. In some embodiments, each of the thermal protection apparatuses 130 can be generally rectangular and planar. In other embodiments, some of the thermal protection apparatuses 130 can be generally rectangular and planar while others can be curved and/or rounded to conform to the shape of the second end 112.

Figure 3:
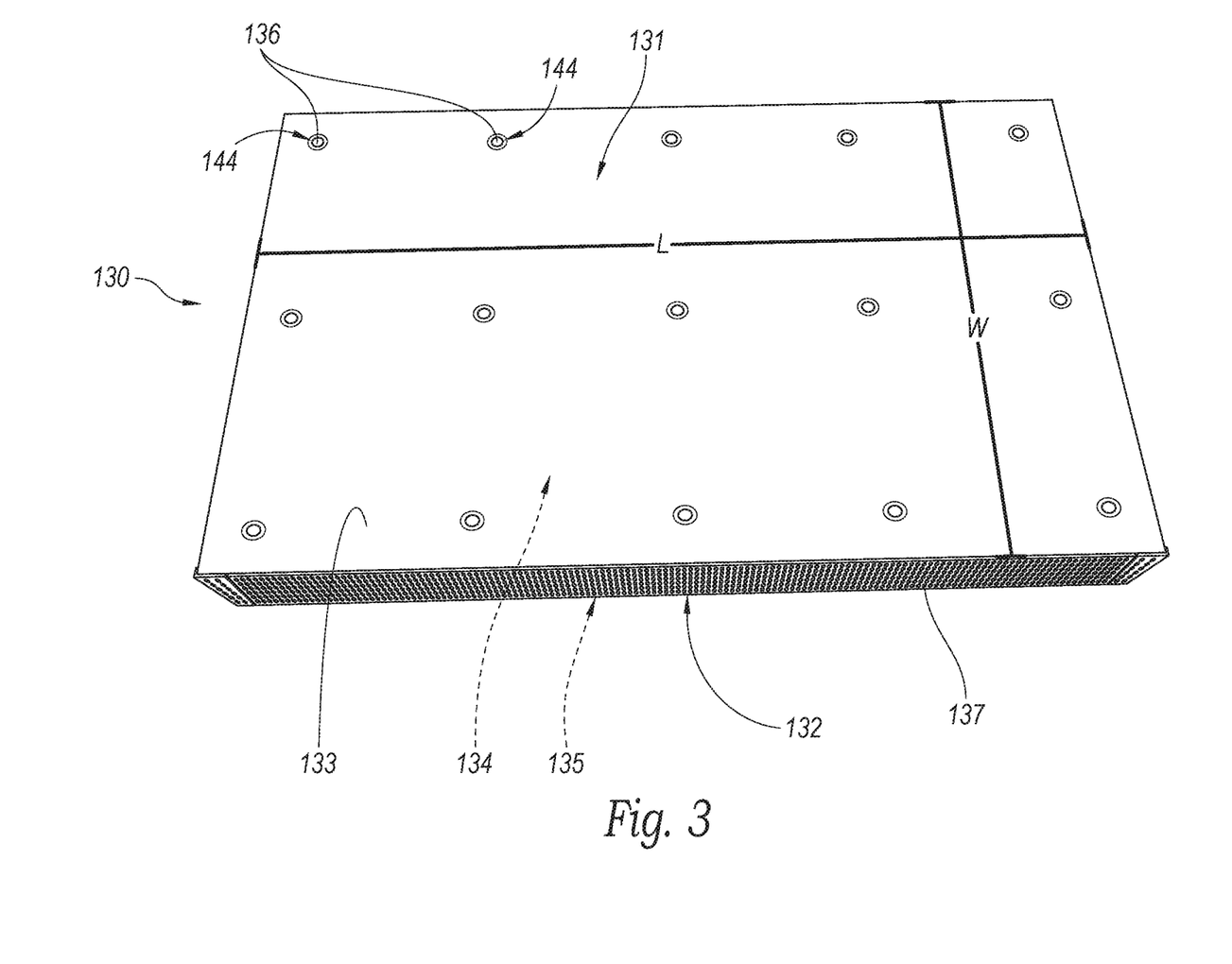
FIG. 3 is a perspective view of one of the thermal protection apparatuses shown in FIG. 2.

FIG. 3 shows a perspective view of a representative rectangular thermal protection apparatuses 130 having a length L and width W. In some embodiments, the thermal protection apparatus 130 can be sized and shaped such that the length L is approximately 18 inches and the width W is approximately 12 inches. In other embodiments, the length L and width W can have other suitable values. The thermal protection apparatus 130 can include a ceramic tile 134 positioned between an outer metal portion (e.g., a layer) 133 and an inner metal portion (e.g., a layer) 135. With this arrangement, the outer metal layer 133 defines an outer surface 131 of the thermal protection apparatus 130 while the inner metal layer 135 defines an inner surface 132. When the thermal protection apparatus 130 is coupled to the launch vehicle, the thermal protection apparatus 130 is positioned such that the inner surface 132 faces towards the body of the launch vehicle while the outer surface 131 faces away. The thermal protection apparatus 130 can also include one or more holes 144 that extend through the outer metal layer 133, the ceramic tile 134, and the inner metal layer 135. In representative embodiments, the metal layers 133 and 135 and the ceramic tile 134 are coupled together with one or more corresponding pins 136 positioned within the holes 144 and coupled to the metal layers 133 and 135. The pins 136 can be arranged in rows and columns within the thermal protection apparatus 130 and each of the pins can be configured to extend from the outer surface 131 to the inner surface 132 by passing through the outer metal layer 133, the ceramic tile 134, and the inner metal layer 135. The pins 136 are each securely coupled to the outer metal layer 133 to hold the outer metal layer 133 against the ceramic tile 134 and to prevent the outer metal layer 133 from detaching. The thermal protection apparatus 130 can also include edging 137 positioned around the perimeter of the ceramic tile 134.

Figure 4:
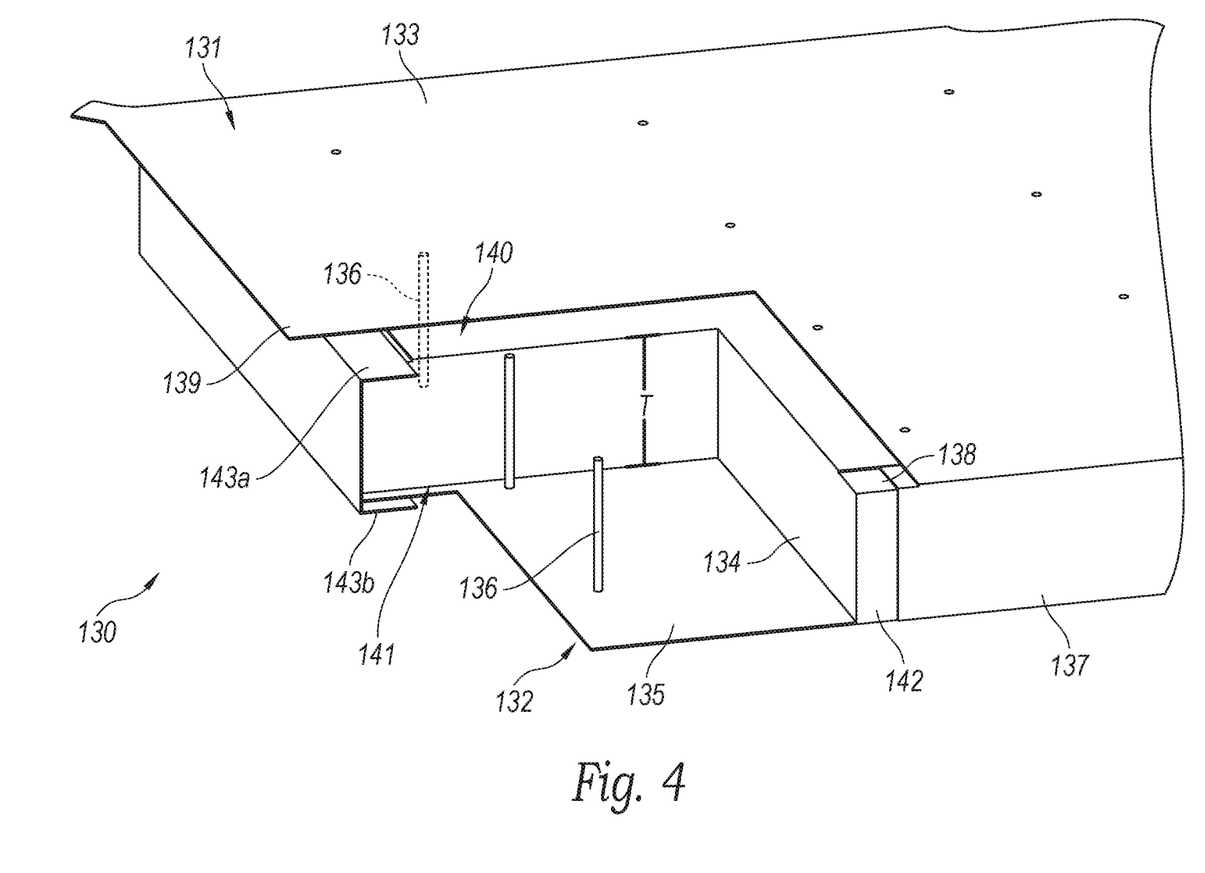
FIG. 4 is a cut-away isometric view of a representative thermal protection apparatus, configured in accordance with embodiments of the present technology.

FIG. 4 shows an isometric cut-away view of a representative thermal protection apparatus 130. The ceramic tile 134 includes opposing top and bottom surfaces 140 and 141. The outer and inner metal portions (e.g., layers) 133 and 135 can each include a thin layer of metal and can be positioned directly against the ceramic tile 134 such that the outer metal layer 133 is positioned against the top surface 140 and the inner metal layer 135 is positioned against the opposing bottom surface 141. The ceramic tile 134 is generally rectangular and can include a notch 138 formed in the top surface 140 and extending around the perimeter of the ceramic tile 134. The edging 137 can be formed from a thin sheet of corrugated metal (e.g., Inconel® 660 available from Special Metals Corporation at www.specialmetals.com/) positioned directly against edge portions 142 of the ceramic tile 134 and coupled to the outer and inner metal layers 133 and 135. As will be discussed in greater detail below, the outer metal layer 133 can laterally expand when the thermal protection apparatus 130 is heated, while the ceramic tile 134 and the inner metal layer 135 may not expand (or may not expand significantly). The corrugated structure of the edging 137 can increase the flexibility of the edging 137 to allow the edging 137 to remain coupled to both the outer metal layer 133 and the inner metal layer 135 as the outer metal layer 133 expands.

The edging 137 can include top and bottom bent portions 143*a* and 143*b*, which are bent over the edge portions 142 of the ceramic tile 134. More specifically, the top bent portion 143*a* is positioned between the outer metal layer 133 and the ceramic tile 134 in the notch 138 while the bottom bent portion 143*b* is positioned against the inner surface 132 such that the inner metal layer 135 is positioned between the bottom bent portion 143*b* and the ceramic tile 140. Further, the top bent portion 143*a* is positioned within the notch portion 138 such that top bent portion 143*a* is coplanar with the top surface 140. As a result, the edging 137 does not extend above the top surface 140, thereby allowing the outer surface 131 to remain generally flat. To couple the edging 137 to the outer and inner metal layers 133 and 135, the outer metal layer 133 can be welded (e.g., tack welded) to the top bent portion 143*a* and the inner metal layer 135 can be welded to the bottom bent portion 143*b*. In some embodiments, the ceramic tile 134 can also include a second notch portion formed in the bottom surface 141 that extends around the perimeter of the ceramic tile 134 and the bottom bent portion 143*b* can be positioned within the second notch portion. In these embodiments, the bottom bent portion 143*b* can be positioned between the inner metal layer 135 and the ceramic tile 134 such that the edging 137 does not extend below the inner surface 132. As will be discussed in further detail below, the outer metal layer 133 can include a lip portion 139 that extends past the edge portions 142 and the edging 137 and that can be used to form a seal between adjacent thermal protection apparatuses 130.

In representative embodiments, the outer metal layer 133 is formed from sheet metal that is less than or equal to 0.25 inches thick and that is cut into a desired size and shape. The outer metal layer can be formed from a metal having high strength and oxidation resistance at high temperatures. During reentry, the temperature that the outer metal layer 133 is heated to generally depends on the speed of the first stage as it descends, where the speed is generally dependent on the altitude at which the first and second stages separated. As such, the outer metal layer 133 can be formed from a metal that retains its strength and oxidation resistance throughout the descent. For example, in embodiments for which the expected temperature does not exceed 1400° F., the outer metal layer 133 can be formed from a metal such as titanium (or alloys that include titanium), which retains its strength and oxidation resistance up to approximately 1400° F. However, in embodiments for which the expected temperature reaches temperatures greater than 1400° F., the outer metal layer 133 can be formed from nickel-based alloys (e.g., Haynes 230® alloys available from Haynes International at www.haynesintl.com/, Inconel® 625 alloys available from Special Metals Corporation at www.specialmetals.com/, HASTELLOY C-22® alloys available from Haynes International at www.haynesintl.com/, etc.), which can retain their strength and oxidation resistance at temperatures up to approximately 2000° F., or refractory alloys (e.g., TZM alloys available from Ed Fagan Inc. at www.edfagan.com/, C-103 alloys available from ATI at www.atimetals.com/), which can retain their strength at temperatures greater than 3000° F.

The outer metal layer 133 typically does not reflect and/or reject heat incident on the outer surface 131. Accordingly, when the outer metal layer 133 is heated, the heat passes through the outer metal layer 133 to the ceramic tile 134. The ceramic tile 134 can be formed from a rigid and porous ceramic material having a low thermal conductivity, a high temperature resistance, and a low coefficient of thermal expansion, and that can include silica and/or alumina fibers bonded together (e.g., CT300 Tooling Board available from COMPOTOOL at www.compotool.com/). As such, when the ceramic material is exposed to heat and high temperatures, the ceramic tile 134 generally retains its size and shape while efficiently rejecting heat transfer. With this arrangement, points within the ceramic tile 134 near the top surface 140 can be hotter than points within the ceramic tile 134 further from the top surface 140. As a result, a temperature gradient can be established through the ceramic tile 134. Accordingly, the ceramic tile 134 can prevent heat from penetrating completely through the ceramic tile 134 so that temperatures at the bottom surface 141 are maintained at lower levels. Further, the ceramic material can have a low density and can be easily manufactured to have a suitable shape and a selected thickness T. The total amount of heat that the ceramic tile 134 rejects is at least partially dependent on the thickness T of the ceramic tile 134 and the thickness T can therefore be selected based on the amount of heat that the thermal protection apparatus 130 is expected to be exposed to during descent. In some embodiments, the thickness T can be approximately 1 inch, between 0.25 and 1 inch, or can be between 1 and 3 inches.

In some embodiments, the porous ceramic material can be capable of readily absorbing water (e.g., water from the atmosphere such as rain, snow, humidity, etc. or water used in cooling or noise suppression systems). However, water is dense and saturating the ceramic tile 134 with water can increase the weight of the thermal protection apparatus 130. To restrict or prevent water ingress, the outer metal layer 133 can act as a hermetic waterproof barrier and can prevent most of the water incident on the outer surface 131 from reaching and being absorbed by the ceramic tiles 134. To further reduce the amount of water capable of being absorbed by the ceramic material, the thermal protection apparatus 130 can include waterproofing applied to the ceramic tile 134. In some embodiments, the waterproofing can be applied to the ceramic tile 134 by submerging the ceramic tile 134 in the waterproofing material for a suitable amount of time.

In some embodiments, the waterproofing can be applied to the bottom surface 141 and the edge portions 142 of the ceramic tile 134. In other embodiments, the waterproofing can be applied through the entire thickness T. However, the high temperatures at points within the ceramic tile 134 near the top surface 140 can cause the waterproofing near the top surface 140 to burn off while the waterproofing near the bottom surface 141 can remain intact throughout the launch and landing. Because some of the waterproofing remains within the ceramic tile 134 and because the outer metal layer 133 can prevent most of the water from reaching the ceramic tile 134, the amount of water that can be absorbed by the ceramic tile 134 can be reduced and the thermal protection apparatus 130 can be used for multiple launches and landings without having to apply waterproofing between launches.

In addition to or in lieu of increasing the waterproofing abilities of the thermal protection apparatus 130, the outer metal layer 133 can increase the durability and toughness of the thermal protection apparatus 130. For example, the ceramic material can be brittle and can crack and break if struck by a tool or by foreign object debris (FOD) during flight. Accordingly, the outer metal layer 133 can provide protection to the ceramic tile 134 from tool strikes and FOD, thereby increasing the impact resistance of the thermal protection apparatus 130. In this way, the ceramic tile 134 can be formed from a wider array of materials. For example, the ceramic tile 134 can be formed from ceramic materials having a high temperature resistance but that are very brittle and tend to fracture easily, as the outer metal layer 133 can prevent the ceramic tile 134 from being struck by tool strikes and FOD. Furthermore, the outer metal layer 133 can be electrically conductive and can be capable of discharging electricity and/or avoiding charge build-up due to lightning, static charges, and/or other sources.

Because the ceramic material can prevent or at least restrict heat from reaching the inner metal layer 135, the inner metal layer 135 can be formed from different metals than the outer metal layer 133. For example, in representative embodiments, the inner metal layer 135 is formed from aluminum or another suitable lightweight metal. The inner metal layer 135 can have a thickness of less than or equal to 0.25 inches and can be used as a back plate to help the pins 136 secure the outer metal layer 133 to the ceramic tile 134. In other embodiments, however, the thermal protection apparatus 130 can be formed without the inner metal layer 135 and instead can include a layer of another suitable type of lightweight material, such as a composite, positioned against the bottom surface 141. In still other embodiments, the thermal protection apparatus 130 can be formed without the inner metal layer 135 or any other layer such that the bottom surface 141 is exposed and the ceramic tile 134 is positioned directly against the body of the first stage. In these embodiments, the weight of the thermal protection apparatus 130 can be reduced compared to existing thermal protection systems, thereby reducing the cost of launching the launch vehicle.

When heated, metal typically expands and can even deform. As such, when the thermal protection apparatus 130 is exposed to high temperatures, the outer metal layer 133 heats up and tends to expand laterally. However, the ceramic material that forms the ceramic tile 134 has a low coefficient of thermal expansion and the inner metal layer 135 is shielded from the high temperatures. Accordingly, neither the ceramic tile 134 nor the inner metal layer 135 expand significantly when the thermal protection apparatus 130 heats up, resulting in the outer metal layer 133 moving laterally relative to the ceramic tile 134 and/or the inner metal layer 135. This thermal expansion mismatch can create stresses on the pins 136, which extend through the entire thickness of the thermal protection apparatus 130. To prevent the pins 136 from detaching from the outer metal layer 133 when the outer metal layer expands and moves, the pins 136 can be formed from a generally flexible material capable of bending and elastically deforming. For example, in some embodiments, the pins 136 can be formed from metals such as molybdenum or niobium. In other embodiments, the pins 136 can be formed from the same metal that the outer metal layer 133 is formed from. In this way, the pins 136 can remain securely attached to the outer metal layer 133 as the outer metal layer 136 expands and contracts.

Figure 5:
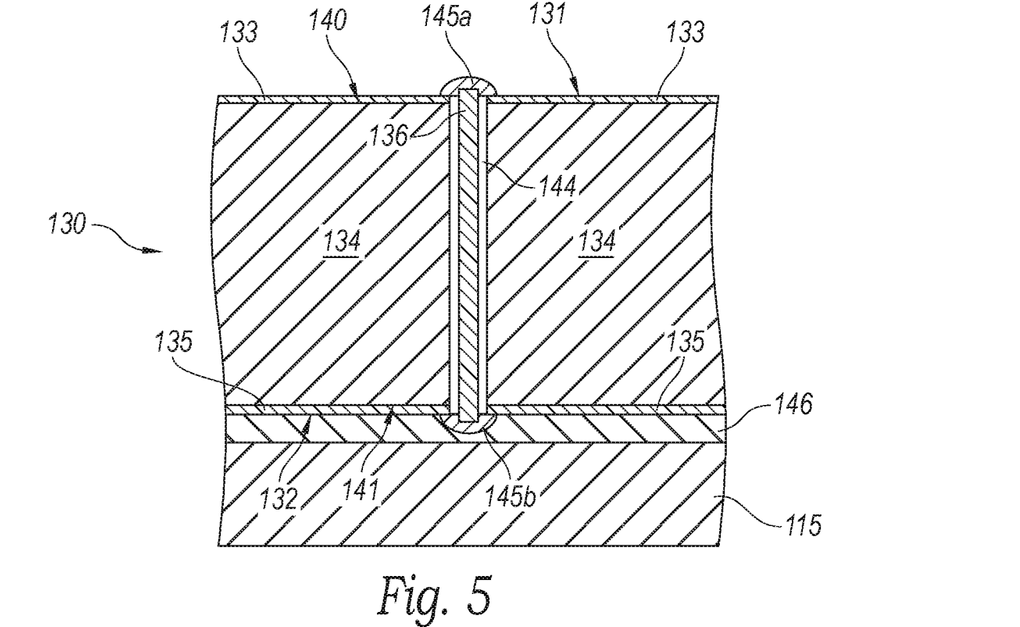
FIGS. 5 and 6 show schematic, cross-sectional views of representative thermal protection apparatuses, configured in accordance with embodiments of the present technology.

FIG. 5 shows a cross-sectional view of one of the pins 136 positioned within a hole 144. To allow the pins 136 sufficient room to bend and flex, each of the holes 144 can be larger than the pins 136. For example, in some embodiments, the pins 136 and the holes 144 can be generally cylindrical and the holes 144 can have a diameter larger than that of the pins 136. In these embodiments, the pins 136 can bend and flex in any direction within the hole. In other embodiments, the pins 136 can be cylindrical while the holes 144 are slot-shaped such that the pins 136 are able to bend and flex along a predetermined direction. In general, the holes 144 can have any suitable size and shape that enables the pins 136 to bend and/or flex sufficiently during operation of the thermal protection apparatus 130.

Each of the holes 144 is formed through the outer metal layer 133, the ceramic plate 134, and the inner metal layer 135, thereby extending from the outer surface 131 to the inner surface 132. When forming the thermal protection apparatus 130, the sheets of metal that form the outer and inner metal layers 133 and 135 can be positioned against the respective top and bottom surfaces 140 and 141 of the ceramic tile 134 before the holes 144 are formed. Once the metals layers 133 and 135 are properly positioned, a drill can be used to form the holes 144 through the outer metal layer 133, the ceramic tile 134, and the inner metal layer 135 and one of the pins 136 can be positioned within each of the holes 144. The pins 136 can be longer than the thickness of the thermal protection apparatus 130 such that the opposing ends of the pins extend beyond the outer and inner surfaces 131 and 132. Once the pins 136 are positioned within their respective holes 144, the pins 136 can be coupled to the outer and inner metal layers 133 and 135. For example, the pins 136 can be securely held in place with threaded nuts, clips, fasteners, brackets, welds, and/or any combination thereof. In the illustrated embodiment, the pin 136 is spot-welded to the outer and inner metal layers 133 and 135 such that the pin 136 is attached to the outer metal layer 133 with weld 145a and to the inner metal layer 135 with weld 145b.

After attaching the pins 136 to the inner and outer metal layers 133 and 135, the thermal protection apparatus 130 can be attached to the body 115 of the first stage of the launch vehicle. In the illustrated embodiment, an adhesive 146 is applied to the inner surface 132 to attach the thermal protection apparatus 130 to the body 115. The adhesive 146 can be a room temperature vulcanizing (RTV) silicone adhesive that can operate at temperatures up to 500° F. (e.g., RTV560 available from Momentive Performance Materials at www.momentive.com) or can include another suitable type of adhesive.

Figure 6:
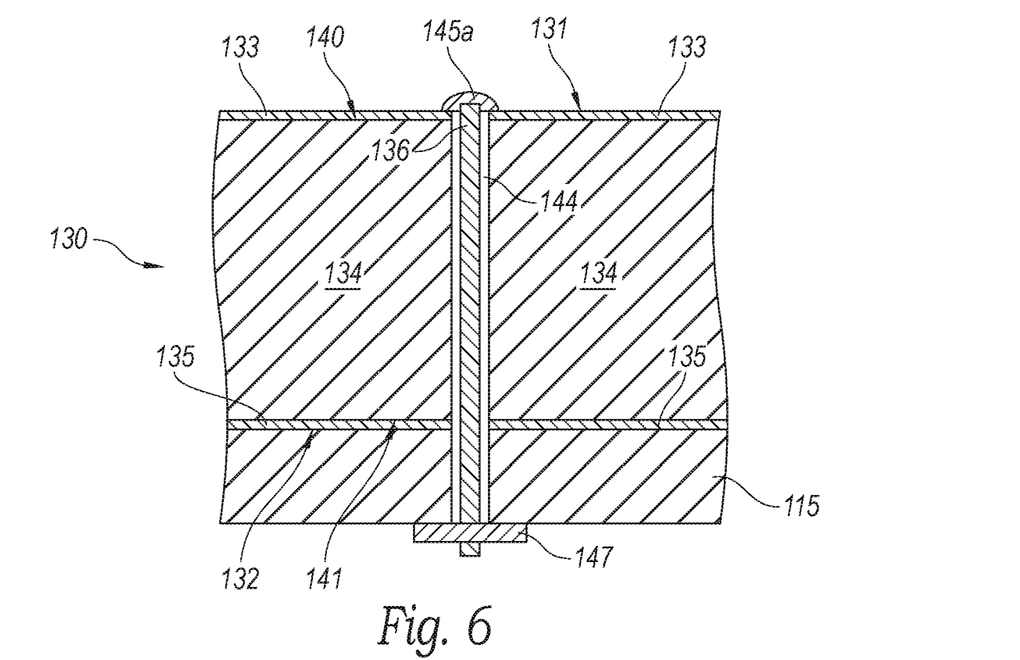

In other embodiments, however, the thermal protection apparatus 130 can be attached to the body 115 without using an adhesive. For example, FIG. 6 shows a cross-sectional view of an embodiment of the thermal protection apparatus 130 that utilizes a fastener 147 coupled to the pin 136 to attach the thermal protection apparatus 130 to the body 115. In the illustrated embodiment, the hole 144 extends through a portion (e.g., a layer) of the body 115. The pin 136 is welded to the outer metal layer 133 with the weld 145a and extends through the outer metal layer 133, the ceramic tile 134, the inner metal layer 135, and a portion of the body 115. The pin 136 extends completely through the portion of the body 115 and the fastener 147 attaches to the end of the pin 136 within the body 115. In this way, the fastener 147 and the body 115 act as a bracket that uses the pin 136 and the weld 145a to pull the outer metal layer 133 into the ceramic tile 134. In other embodiments, the pin 136 can be attached to the body 115 using a different attachment mechanism, such as a nut. In still other embodiments, the pin 136 can be welded to the body 115. In any of these embodiments, the portion of the body 115 to which the pin 136 is attached can be a shell that is accessible from inside for attachment. In other embodiments, the pin 136 can be attached using blind fastening techniques. In the illustrated embodiment, the inner metal layer 135 is positioned directly against the body 115 of the launch vehicle. In other embodiments, an adhesive (e.g., adhesive 146) can be used such that thermal protection apparatus 130 is coupled to the body 115 with both the fastener 147 and the adhesive.

Figure 7:
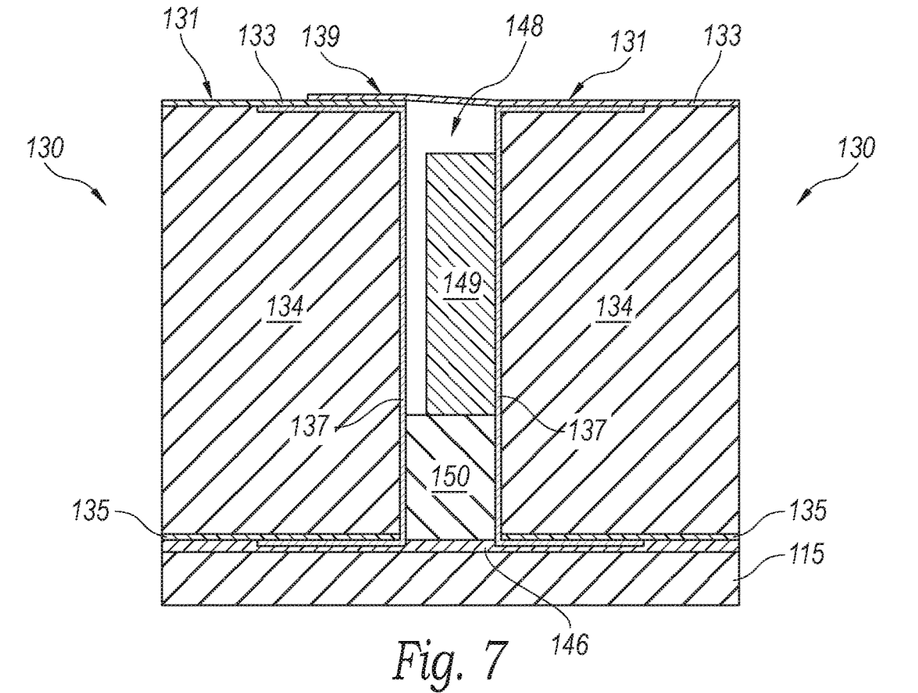
FIGS. 7 and 8 show schematic, cross-sectional views of sealing mechanisms between two adjacent thermal protection apparatuses, configured in accordance with embodiments of the present technology.

When arranging the thermal protection apparatuses 130 on the launch vehicle, gaps between adjacent thermal protection apparatuses 130 may initially be present. For example, in some embodiments, adjacent thermal protection apparatuses 130 can be separated from each other by a gap of approximately 0.19 inches. To prevent water and heat from passing through these gaps, the gaps can be sealed. FIG. 7 shows a cross-sectional view of two thermal protection apparatuses 130 separated from each other by a gap 148. In the illustrated embodiment, the upper metal layer 133 on the right thermal protection apparatuses 130 includes a lip portion 139. The lip portion 139 extends over the gap 148 and is positioned over the outer surface 131 of the left thermal protection apparatus 130. The lip portion 139 can be slightly bent so that it is positioned directly against the outer surface 131 and can be welded to the outer metal layer 133 of the left thermal protection apparatus 130 to couple the two thermal protection apparatuses 130 to each other. A gasket 149 can be positioned within the gap 148 between the two edgings 137, and a ceramic rope seal 150 can be positioned between the gasket 149 and the body 115 of the launch vehicle.

When the thermal protection apparatus 130 heats up, both the outer metal layer 133 and the edging 137 can expand due to thermal expansion. Accordingly, both of the outer metal layers 133 and both of the edgings 137 can expand into the gap 148. As they expand, the width of the gap 148 decreases and the gasket 149, which can be formed from a ceramic having a low thermal expansion coefficient, can be pushed by one of the edgings 137 until it contacts the other edging 137. The gasket 149 can be sandwiched between the two edgings 137, forming a seal that prevents, or at least inhibits, heat from passing through the gap 148. The ceramic rope seal 150 can be used to prevent, or at least inhibit, heat that passes by the gasket 149 from reaching the body 115. Further, the temperature gradient established by the ceramic tile 134 when the thermal protection apparatus 130 is heated results in the top portions of the edgings 137 (i.e., the portions of the edgings 137 near the outer metal layer 133) expanding and deforming significantly more than the bottom portions of the edgings 137 (i.e., the portions of the edgings 137 near the inner metal layer 135), which may not substantially deform or expand due to heat.

Each of the thermal protection apparatuses 130 can include the lip portion 139. For example, in some embodiments, each of the generally rectangular thermal protection apparatuses 130 can have two adjacent sides that each includes the lip portion 139 while the other two sides do not. In these embodiments, the thermal protection apparatuses 130 are arranged such that the edges having the lip portion 139 are positioned directly adjacent to the edges of an adjacent thermal protection apparatus 130 that do not have the lip portion 139. In this way, the thermal protection apparatuses 130 can be arranged such that each gap 148 is covered by a single lip portion 139. In other embodiments, the thermal protection apparatuses 130 can include lip portions 139 on two opposing edges and not the other two edges. In still other embodiments, some of the thermal protection apparatuses 130 that form the heat shield can include lip portions 139 on all four edges while other thermal protection apparatuses 130 do not include lip portions 139 along any of the edges.

Figure 8:
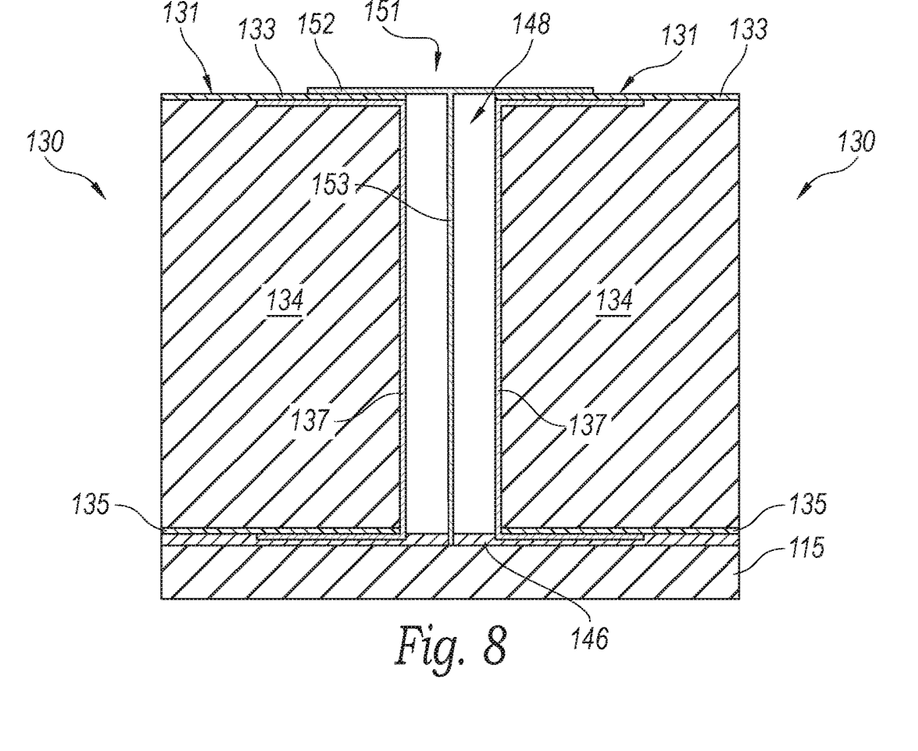

In some embodiments, none of the thermal protection apparatuses 130 include lip portions 139. In these embodiments, the gaps 148 can be sealed using other sealing mechanisms. FIG. 8 shows a cross-sectional view of a representative sealing mechanism. In this embodiment, neither of the outer metal layers 133 of adjacent thermal protection apparatuses have lip portions that extend over the gap 148. Instead, a T-seal 151 is positioned within the gap 148. The T-seal 151 can be a generally T-shaped structure having a first portion 152 coupled to a second portion 153 that is generally perpendicular to the first portion 152. The first portion 152 can be positioned on the outer surface 131 and can extend across the gap 148 while the second portion 153 can be positioned within the gap 148 and can extend from the first portion 152 to the body 115 of the launch vehicle. The T-seal 151 can be formed from metal and can be welded to the thermal protection apparatuses 130 and/or the body 115 to seal the gap 148. For example, the first portion 152 can be welded (e.g., tack welded) to the outer metal layers 133 of the two adjacent thermal protection apparatuses 130 and the second portion 153 can be welded to the body 115 within the gap 148. In this way, the T-seal 151 can help to prevent or inhibit heat and water from entering the gap 148. In some embodiments, ceramic gaskets can be positioned within the gap 148 between the second portion 153 and the edgings 137 in order to provide additional thermal protection to the body 115.

In the illustrated embodiments, the outer metal layer 133 is formed from sheet metal cut to a suitable size and shape and positioned on the ceramic tile 134. In other embodiments, the outer metal layer 133 can be formed using other techniques. For example, in some embodiments, the outer metal layer 133 can be formed using a thermal spray technique. In these embodiments, holes can be drilled into the ceramic tile 134 and the pins can be inserted into the holes before the outer metal layer 133 is formed. After depositing the pins within the holes, metal feedstock can be melted (e.g., via electricity, plasma, or a flame) and the molten metal can be sprayed or otherwise disposed over the top surface of the ceramic tile 134. The molten metal can weakly bond (or not bond at all) with the ceramic tile 134 but can strongly bond with the metal pins.

From the foregoing, it will be appreciated that several embodiments of the disclosed technology have been described herein for purposes of illustration, but that various modifications can be made without deviating from the technology. For example, in some applications, the thermal protection apparatus can be filled with a material other than a ceramic, and/or can be or can include a soft and flexible material. The thermal protection apparatus can be coupled to any portion of a launch vehicle, and/or vehicles that do not ascend into space, such as airplanes and/or helicopters. The thermal protection apparatus can be applied to stationary structures such as furnaces and power plants. More generally, in some embodiments, the thermal protection apparatus can be coupled to any suitable structure to provide insulation to that structure. In some embodiments, a single thermal protection apparatus includes multiple pins to secure the outer and inner metal portions to the tile, and in some embodiments, a single pin performs this function.

Certain aspects of the technology described in the context of particular embodiments can be combined or eliminated in other embodiments. For example, the edging can be positioned around the top half of the ceramic tile but not the bottom half or can be eliminated entirely. Further, while advantages associated with some embodiments of the disclosed technology have been described herein, configurations with different characteristics can also exhibit such advantages, and not all configurations need necessarily exhibit such advantages to fall within the scope of the technology. Accordingly, the disclosure and associated terminology can encompass other arrangements not expressly shown or described herein.

To the extent any materials incorporated herein by reference conflict with the present disclosure, the present disclosure controls. As used herein, the phrase "and/or" as in "A and/or B" refers to A alone, B alone and both A and B.

We claim:

1. An aerospace system, comprising:
   a launch vehicle having a first end and a second end opposite the first end; and
   a heat shield positioned toward the second end and comprising a plurality of thermal protection apparatuses, wherein individual thermal protection apparatuses comprise:
   a rigid ceramic tile having opposing top and bottom surfaces and a plurality of holes that extend between the opposing top and bottom surfaces;
   an outer metal portion positioned adjacent to and fully covering the top surface, wherein the outer metal portion defines an exterior surface of the thermal protection apparatus;
   an edging positioned around a perimeter of the ceramic tile, wherein the edging has a top bent portion coupling the edging to the outer metal portion; and
   a plurality of pins positioned within corresponding individual holes, wherein individual pins are coupled to the outer metal portion.

2. The aerospace system of claim 1 wherein the individual thermal protection apparatuses comprise an inner metal portion positioned adjacent to and fully covering the bottom surface.

3. The aerospace system of claim 2 wherein the edging is coupled to the inner metal portion, and wherein the edging is configured to remain coupled to the outer metal portion and the inner metal portion as the outer metal portion expands.

4. The aerospace system of claim 1 wherein the individual pins are welded to the outer metal portion.

5. The aerospace system of claim 1, wherein the edging extends between the top and bottom surfaces.

6. The aerospace system of claim 5, wherein—
   the ceramic tile includes a notch formed in the top surface that extends around the perimeter of the ceramic tile, and
   the top bent portion positioned in the notch such that the top bent portion is coplanar with the top surface and is positioned between the ceramic tile and the outer metal portion.

7. The aerospace system of claim 1, wherein—
   the plurality of thermal protection apparatuses comprises first and second thermal protection apparatuses positioned directly adjacent to each other,
   the first and second thermal protection apparatuses are separated from each other by a gap,
   the outer metal portion of the first thermal protection apparatus includes a lip portion that extends over the gap and is welded to the outer metal portion of the second thermal protection apparatus.

8. The aerospace system of claim 1 wherein the individual thermal protection apparatuses are coupled to the launch vehicle with the individual pins.

9. The aerospace system of claim 1, further comprising:
   an adhesive, wherein the individual thermal protection apparatuses are coupled to the launch vehicle with the adhesive.

10. The aerospace system of claim 1 wherein the outer metal portion of the individual thermal protection apparatuses is positioned to directly face an environment around the launch vehicle.

11. The aerospace system of claim 1 wherein the top bent portion is coplanar with the top surface and is positioned between the ceramic tile and the outer metal portion.

12. The aerospace system of claim 1, further comprising an inner metal portion positioned between the bottom surface and the launch vehicle and fully covering the bottom surface.

13. The aerospace system of claim 1 wherein—
    the edging includes a bottom bent portion,
    the top bent portion is positioned between the top surface and the outer metal portion,
    the ceramic tile includes a notch formed in the top surface and that extends around the perimeter of the ceramic tile, and
    the top bent portion is positioned within the notch such that the top bent portion is coplanar with the top surface.

14. The aerospace system of claim 1 wherein the holes are larger than the corresponding ones of the pins such that the pins can bend and flex within the corresponding ones of the holes.

15. The aerospace system of claim 1 wherein the edging has a bottom bent portion.

16. An aerospace system, comprising:
    a launch vehicle having a first end and a second end opposite the first end; and
    a heat shield positioned toward the second end and comprising a plurality of thermal protection apparatuses, wherein individual thermal protection apparatuses comprise:
    a rigid ceramic tile having opposing top and bottom surfaces and a plurality of holes that extend between the opposing top and bottom surfaces;
    an outer metal portion positioned adjacent to and fully covering the top surface, wherein the outer metal portion defines an exterior surface of the thermal protection apparatus;
    an inner metal portion positioned between the bottom surface and the launch vehicle and fully covering the bottom surface;
    an edging positioned around a perimeter of the ceramic tile, wherein the edging has a top bent portion coupling the edging to the outer metal portion; and
    a plurality of pins positioned within corresponding individual holes, wherein individual pins are coupled to the outer metal portion.

17. The aerospace system of claim 16 wherein individual ones of the pins are welded to the outer metal portion and the inner metal portion.

18. The aerospace system of claim 16 wherein the edging is formed of a corrugated metal, and wherein the edging is coupled to the outer metal portion and the inner metal portion.

19. The aerospace system 16 wherein the holes are larger than the corresponding ones of the pins such that the pins can bend and flex within the corresponding ones of the holes.

20. The aerospace system of claim 16 wherein the edging has a bottom bent portion.

* * * * *

UNITED STATES PATENT AND TRADEMARK OFFICE
CERTIFICATE OF CORRECTION

| | | |
|---|---|---|
| PATENT NO. | : 11,667,408 B2 | Page 1 of 1 |
| APPLICATION NO. | : 16/437529 | |
| DATED | : June 6, 2023 | |
| INVENTOR(S) | : John Paul Brendel et al. | |

It is certified that error appears in the above-identified patent and that said Letters Patent is hereby corrected as shown below:

In the Claims

In Column 13, Line 5, in Claim 19, delete "system" and insert -- system of claim --.

Signed and Sealed this
Twenty-second Day of August, 2023

*Katherine Kelly Vidal*

Katherine Kelly Vidal
*Director of the United States Patent and Trademark Office*